(12) United States Patent
Francois

(10) Patent No.: US 11,162,640 B2
(45) Date of Patent: Nov. 2, 2021

(54) METHOD FOR MEASURING THE QUANTITY OF GAS INTRODUCED INTO A RESERVOIR AND FILLING STATION

(71) Applicant: L'Air Liquide, Societe Anonyme pour l'Etude et l'Exploitation des Procedes Georges Claude, Paris (FR)

(72) Inventor: Thibaut Francois, Fontanil Cornillon (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 99 days.

(21) Appl. No.: 16/603,376

(22) PCT Filed: Mar. 29, 2018

(86) PCT No.: PCT/FR2018/050774
§ 371 (c)(1),
(2) Date: Oct. 7, 2019

(87) PCT Pub. No.: WO2018/185404
PCT Pub. Date: Oct. 11, 2018

(65) Prior Publication Data
US 2020/0032959 A1    Jan. 30, 2020

(30) Foreign Application Priority Data

Apr. 7, 2017   (FR) ...................................... 1753045

(51) Int. Cl.
| F17C 5/06 | (2006.01) |
| F17C 13/02 | (2006.01) |
| G01F 15/00 | (2006.01) |

(52) U.S. Cl.
CPC ................ *F17C 5/06* (2013.01); *F17C 13/02* (2013.01); *G01F 15/002* (2013.01);
(Continued)

(58) Field of Classification Search
CPC ...... F17C 5/06; F17C 13/02; F17C 2260/026; F17C 2260/024; F17C 2265/065;
(Continued)

(56) References Cited

U.S. PATENT DOCUMENTS

| 5,671,785 A * | 9/1997 | Andersson ........... B67D 7/0486 |
| | | 141/59 |
| 6,708,573 B1 * | 3/2004 | Cohen ................... F17C 13/028 |
| | | 73/865 |

(Continued)

FOREIGN PATENT DOCUMENTS

| JP | 2007 024152 | 2/2007 |
| JP | 2014 043882 | 3/2014 |

OTHER PUBLICATIONS

International Search Report and Written Report for PCT/FR2018/050774, dated Jul. 6, 2018.
(Continued)

*Primary Examiner* — Nicolas A Arnett
(74) *Attorney, Agent, or Firm* — Christopher J. Cronin

(57) ABSTRACT

A measured quantity of gas is introduced into a gas reservoir via a filling station including a flow meter. The quantity of gas transferred by the filling station to the reservoir is measured by the flow meter. The measured quantity of gas is reduced or increased by a predetermined corrective amount to yield a corrected gas quantity.

10 Claims, 1 Drawing Sheet

(52) U.S. Cl.
CPC ............................ *F17C 2221/012* (2013.01); *F17C 2225/0123* (2013.01); *F17C 2227/04* (2013.01); *F17C 2227/044* (2013.01); *F17C 2250/043* (2013.01); *F17C 2250/0439* (2013.01); *F17C 2260/024* (2013.01); *F17C 2260/026* (2013.01); *F17C 2265/065* (2013.01)

(58) Field of Classification Search
CPC ............ F17C 2227/04; F17C 2227/044; F17C 2225/0123; F17C 2221/012; F17C 2250/043; F17C 2250/0439; G01F 15/002
See application file for complete search history.

(56) References Cited

U.S. PATENT DOCUMENTS

| | | | | |
|---|---|---|---|---|
| 9,557,744 | B2* | 1/2017 | Ding | G01F 15/005 |
| 10,030,816 | B2* | 7/2018 | Handa | F17C 13/026 |
| 2003/0209282 | A1* | 11/2003 | Satou | F17C 5/00 |
| | | | | 141/97 |
| 2007/0186982 | A1* | 8/2007 | Cohen | F17C 5/007 |
| | | | | 137/487.5 |
| 2009/0084194 | A1 | 4/2009 | Shock et al. | |

OTHER PUBLICATIONS

French Search Report and Written Opinion for FR 1753045, dated Dec. 6, 2017.

\* cited by examiner

METHOD FOR MEASURING THE QUANTITY OF GAS INTRODUCED INTO A RESERVOIR AND FILLING STATION

CROSS-REFERENCE TO RELATED APPLICATIONS

This application is a § 371 of International PCT Application PCT/FR2018/050774, filed Mar. 29, 2018, which claims § 119(a) foreign priority to French patent application FR 1753045, filed Apr. 7, 2017.

BACKGROUND

Field of the Invention

The invention relates to a method for measuring the quantity of gas introduced into a tank, and to a filling station.

The invention relates more particularly to a method for measuring the quantity of gas introduced into a gas tank via a filling station provided with a filling pipe comprising an upstream end connected to at least one source of pressurized gas and a downstream end connected to a tank that is to be filled, the filling pipe comprising a flow meter and at least a downstream isolation valve positioned between the flow meter and the downstream end of the filling pipe, the method comprising a step of transferring gas from the source to a tank, during which step the downstream isolation valve is open, a step of interrupting the transfer of gas with closure of the downstream valve, the method comprising a step of measuring, using the flow meter, the quantity of gas transferred during the transfer step.

Related Art

Filling stations for filling pressurized-gas tanks, notably the fuel-gas tanks of vehicles, need to measure the quantity of gas introduced into the tank, with a relatively high level of precision. This is particularly true of the filling of pressurized hydrogen-gas tanks.

This quantity needs to be measured (metered) so that a charge can be made for it (in the same way as a liquid fuel).

In the case of a gas, for example hydrogen, there are a great many parameters that influence the measurement of this quantity (pressure, temperature, volume, flow rate, etc.).

This quantity is dependent in particular on the initial conditions (notably the pressure in the tank prior to filling) and the final conditions (notably the pressure after filling). This quantity is also difficult to measure because in general a quantity of gas present in the circuit is purged to the outside after filling. The purpose of this purge is to lower the pressure in the hose of the filling pipe in order to allow the user to disconnect the end of the filling pipe from the tank.

Ideally, the flow rate of gas transferred should be measured as close as possible to the tank (at the filling nozzle). However, for industrial and technical reasons, this flow rate measurement is in fact performed further upstream. Thus, some of the gas measured by the flow meter is not transferred into the tank and there is a risk that the customer will be charged for it.

In order to measure, as correctly as possible, the quantity of gas transferred (and therefore chargeable) it is known practice not to count the gas, if any, injected during the pre-filling test (pulses of gas may be used for leak testing and/or for calculating the volume of the tank or other parameters).

SUMMARY OF THE INVENTION

It is an object of the invention to propose a method and/or a device that makes it possible to improve the precision with which this quantity of gas actually supplied to the tank is measured.

It is an object of the present invention to alleviate all or some of the above-mentioned disadvantages of the prior art.

To this end, the method according to the invention, in other respects in accordance with the generic definition thereof given in the above preamble, is essentially characterized in that it comprises a step of generating a signal indicating the corrected quantity of gas transferred, which is obtained by reducing or by increasing, by a determined corrective quantity, the transferred quantity of gas measured by the flow meter during the transfer step.

Moreover, embodiments of the invention may comprise one or more of the following features:

the signal indicating the corrected quantity of gas transferred is stored and/or transmitted and/or displayed, the signal indicating the corrected quantity of gas transferred is used in a step of calculating the charge to be made for the quantity of gas introduced into the tank, the determined corrective quantity of gas is a fixed quantity, the determined corrective quantity is comprised between one and fifty grams, and preferably between two and twenty grams, and notably between five and ten grams, the final pressure in the tank or in the filling pipe at the end of the transfer step is measured or estimated, and in that the determined corrective quantity is a quantity which varies according to this final pressure, notably proportionally, the determined corrective quantity of gas is subtracted from the measured quantity of gas transferred and is comprised between 9 and 7.4 grams when the final pressure in the tank that is to be filled or in the filling pipe is comprised between 850 and 700 bar and comprised between 7.4 and 6.3 grams when the final pressure in the tank (2) that is to be filled or in the filling pipe is comprised between 700 and 600 bar, the determined corrective quantity of gas is a quantity which varies according to the temperature of the gas in the tank that is to be filled or in the filling pipe, the filling pipe comprises, downstream of the downstream isolation valve, a controlled purge valve for purging to outside the filling pipe at least some of the pressurized gas trapped in the downstream part of the filling pipe after the transfer step, the method comprising, after the transfer step, a step of purging the filling pipe involving opening the purge valve, the determined corrective quantity of gas being the calculated or measured quantity of gas discharged via the purge valve, the determined corrective quantity of gas is calculated by a perfect-gas or real-gas equation applied to the gas in the downstream part of the filling pipe before the purge step and after the purge step on the basis of the following parameters: the known volume of the filling pipe downstream of the downstream isolation valve, the measured final pressure in the tank that is to be filled or in the filling pipe at the end of the transfer step before the purge step, the measured or estimated temperature of the gas in the tank that is to be filled or in the filling pipe, the known nature of the gas and notably its molar mass, the pressure in the filling pipe after the purge step, and in that the corrective quantity is the result of the difference between the calculated quantity of gas present in the downstream part of the filling pipe before the purge step and the calculated quantity of gas present in the downstream part of the filling pipe after the purge step, the filling pipe comprises a purge flow meter situated downstream of the purge valve for measuring the quantity of gas purged during the purge step, and in that the determined corrective quantity of gas is the quantity of gas measured by the purge flow meter or a determined fraction thereof, the generation of a signal indicating the corrected quantity of gas transferred is obtained by subtracting or by adding a determined quantity of gas from or to the quantity of gas transferred as measured by the flow meter during the transfer step, the flow meter is of the type that generates electric signals in the form of successive pulses each corresponding to an elementary measured quantity of gas, the generation of a signal indicating the corrected quantity of gas transferred being obtained by subtracting or by adding a determined quantity of pulses from or to the sum of the pulses generated by the flow meter during the transfer step, the filling station comprises an electronic data processing and storage device, notably comprising a microprocessor or a computer, said electronic device being configured to receive a signal indicative of the quantity of gas transferred as measured by the flow meter during the transfer step and to calculate and/or receive and/or transmit and/or display the signal indicating the corrected quantity of gas transferred, the determined corrective quantity of gas is a determined percentage of the quantity of gas measured by the flow meter during the transfer step.

The invention also relates to a filling station for filling tanks with pressurized fluid, notably for filling tanks with pressurized hydrogen, comprising a filling pipe comprising an upstream end connected to at least one source of pressurized gas and at least one downstream end intended to be connected to a tank that is to be filled, the filling pipe comprising a flow meter and at least one downstream isolation valve positioned between the flow meter and the downstream end of the filling pipe, the at least one valve being operated in such a way as to allow a step of transferring gas from the source to the tank, the flow meter being configured to measure the quantity of gas transferred and to generate a corresponding signal, the station comprising an electronic data processing and storage device, notably comprising a microprocessor or a computer, the electronic device being configured to receive the signal from the flow meter and to generate a signal indicative of the corrected quantity of gas transferred, which is obtained by reducing or by increasing, by a determined corrective quantity, the transferred quantity of gas measured by the flow meter during the transfer.

The invention may also relate to any alternative device or method comprising any combination of the features above or below.

BRIEF DESCRIPTION OF THE FIGURES

Further particular features and advantages will become apparent from reading the following description, given with reference to the figures, in which.

DETAILED DESCRIPTION OF THE INVENTION

Figure 1:
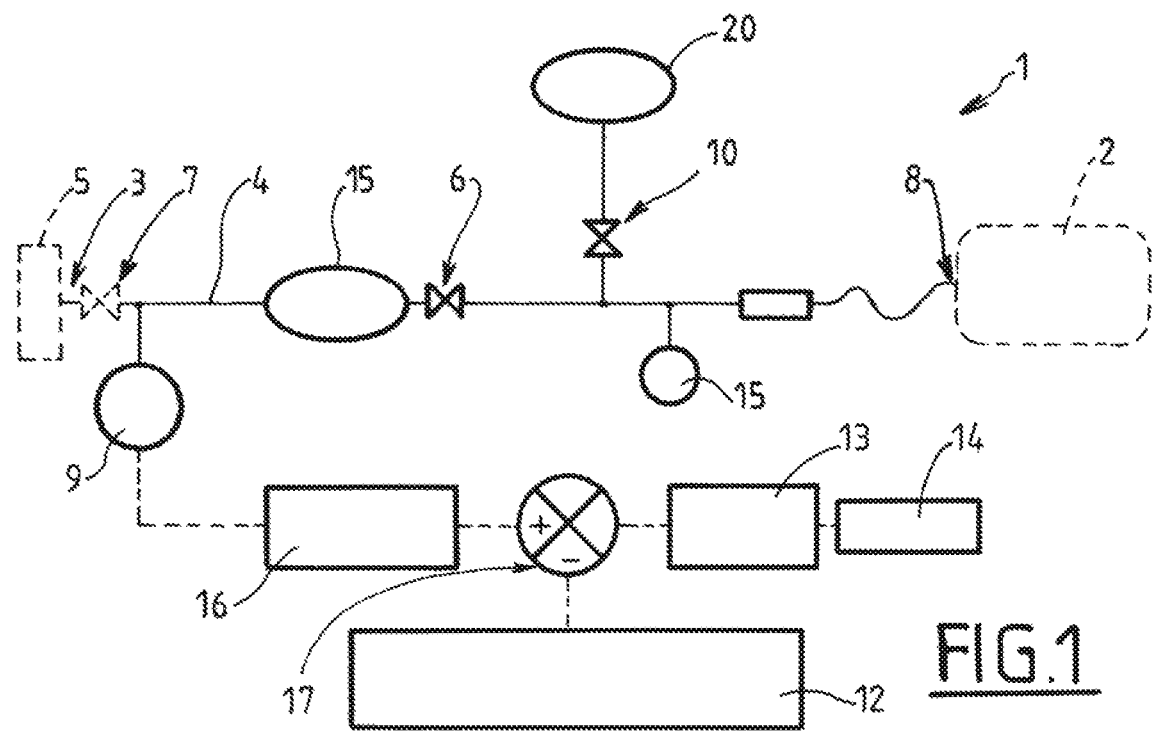
FIG. 1 is a schematic and partial view illustrating one example of a structure and operation of a filling station according to a first possible exemplary embodiment of the invention.

The filling station 1 for filling tanks with pressurized fluid as schematically indicated in FIG. 1 conventionally comprises a filling pipe 4 comprising at least one upstream end 3 connected to at least one source 5 of pressurized gas and at least one downstream end 8 intended to be connected to a tank 2 that is to be filled.

The source of gas (notably hydrogen) may comprise at least one of the following: one or more tanks of pressurized gas, notably several tanks connected in parallel for cascade filling, a compressor, a source of liquefied gas and a vaporizer, and/or any other appropriate source of pressurized gas.

The downstream end comprises for example at least one flexible hose, the terminal end of which comprises a coupling, preferably a quick coupling, allowing it to be connected in a sealed manner to the inlet of a tank 2 or of a filling circuit for filling the tank 2 (notably of a vehicle).

The filling pipe 4 comprising a flow meter 9 and at least one downstream isolation valve 6 positioned between the flow meter 9 and the downstream end 8 of the filling pipe 4. The isolation valve 6 is preferably an operated valve 6 controlled in such a way as to allow a step of transferring gas from the source 5 to the tank 2 when this valve is open.

The flow meter 9 is preferably of the Coriolis-effect type and is configured to measure the transferred quantity of gas and to generate a corresponding signal (preferably an electrical signal).

The station 1 comprises an electronic data processing and storage device 12, notably comprising a microprocessor or a computer. This electronic device 12 is configured to receive the signal from the flow meter 9 and to generate a signal indicating the corrected quantity of gas transferred which is obtained by reducing or by increasing, by a determined corrective quantity, the measured quantity of gas transferred, as measured by the flow meter 9 during the transfer.

For preference, the electronic device 12 can be configured to control all or some of the valves 6, 10 or components of the station and/or to receive measurements 15 of pressure and/or temperature in the filling circuit (upstream and/or downstream of the downstream isolation valve 6. In particular, the electronic device 12 may be configured to control the transfer of gas to the tank (control the flow rate and/or the sources . . . ).

In addition, the electronic device 12 may comprise or be associated with a man machine interface comprising, for example, a display 13 and/or a payment and/or input and/or identification terminal 14. The electronic device 12 may comprise wireless communication means for transmitting or receiving these data and/or other data. In particular, all or part of the data storage and/or computing and/or display and/or invoicing means may be sited away from the station 1 (via the Internet or local network and using, for example, mobile telephony applications).

As illustrated, the filling pipe 4 also preferably further comprises a purge valve 10 situated downstream of the downstream isolation valve 6.

The purge valve 10 is preferably controlled in such a way as to discharge to outside the filling pipe 4 at least some of the pressurized gas trapped in the downstream part of the filling pipe 4 after a transfer step (at the end of a filling operation). The purged gas is discharged into the atmosphere or into a recovery zone 20.

By reducing or increasing, by a corrective quantity, the measured quantity of gas transferred as measured by the flow meter 9 during the transfer step it is thus possible to display and/or to charge the user for a quantity of gas which is closer or equal to the quantity of gas actually transferred into the tank 2.

The determined corrective quantity of gas May be a quantity (for example a determined mass of gas) that is fixed irrespective of the filling conditions. For example, the determined corrective quantity is comprised between one and fifty grams, and preferably between two and twenty grams, and notably between five and ten grams, for example nine grams when the pressure in the tank at the end of filling is equal to 850 bar and with a temperature kept at −33° C. by cooling. This corrective quantity may be equal to seven grams when the pressure in the tank at the end of filling is equal to 660 bar for a temperature of −33° C.

For example, the corrective quantity will be independent of the final pressure at the end of the gas transfer step. This quantity will be preestablished for maximum filling-pressure conditions (200 bar, 350 bar or 700 bar for example). In that case, there is no need to provide a pressure sensor 15 in the measurement and calculation loop.

As an alternative or in combination, this corrective quantity is a fixed quantity or a (fixed or variable) percentage which is dependent on (varies according to) the following conditions, and, for example, the final pressure.

Thus, in the event that different tanks are filled at different pressures, the determined corrective quantities may be different.

The determined corrective quantity may correspond to a predetermined value corresponding to determined thermodynamic conditions: volume, temperature a pressure and/or density.

For example, the final pressure in the tank 2 or in the filling pipe 4 at the end of the transfer step is measured 15 (or estimated), and the determined corrective quantity is a quantity which varies according to this final pressure, notably proportionally. Likewise, the determined corrective quantity may be a quantity that is fixed according to the final pressure interval at the end of the transfer step. For example, (notably for gas temperature of −33° C. in the pipe 4) and a hose five meters long and having a determined volume), for a final pressure comprised between 850 and 700 bar this corrective quantity may be comprised between 9 and 7.4 grams, whereas for a final pressure comprised between 700 and 600 grams, this corrective quantity may be comprised between 7.4 and 6.3 grams.

Likewise, the determined corrective quantity is a fixed quantity according to the pressure interval at the end of the transfer step and is comprised between 11 and 5 grams when the pressure in the tank that is to be filled or in the filling pipe 4 is comprised between 850 and 700 bar and between 8 and 2.5 grams when the pressure in the tank 2 that is to be filled or in the filling pipe 4 is comprised between 700 and 400 bar, and comprised between 6 and 1 gramme when the pressure in the tank 2 that is to be filled or in the filling pipe 4 is comprised between 400 and 200 bar.

For example, the determined corrective quantity of gas is taken away from the measured quantity of gas transferred and is comprised between 9 and 6 grams when the final pressure in the tank that is to be filled or in the filling pipe is comprised between 850 and 600 bar.

The determined corrective quantity of gas may possibly also vary according to the temperature of the gas in the tank 2 that is to be filled or in the filling pipe 4.

The determined corrective quantity of gas may possibly vary according to the (known or measured) volume of the tank 2, and/or according to the known or measured volume of the filling circuit 4.

The determined corrective quantity of gas may be the calculated or measured quantity of gas discharged via the purge valve 10.

For example, the quantity of gas purged may be estimated from the volume contained in the circuit 4 between the downstream isolation valve 6 and the downstream end 8, from the pressure 15 measured in this part of the circuit 4, from the measured or estimated temperature in this part of the circuit 4, from the characteristics of the gas (its nature, its molar mass . . . ), And from the final pressure in the pipe 4 after the transfer step and after the purge step. On the basis of the parameters, the density and/or the mass of gas purged can be calculated.

For example, the determined corrective quantity of gas is calculated using a state equation for the gas. For example, this quantity is calculated by the perfect-gas or real-gas equation applied to the gas in the downstream part of the filling pipe before the purge step and after the purge step on the basis of the following parameters: the known volume of the filling pipe downstream of the downstream isolation valve 6, the measured final pressure in the tank 2 that is to be filled or in the filling pipe 4 at the end of the transfer step before the purge step, the measured or estimated temperature of the gas in the tank 2 that is to be filled or in the filling pipe 4, the known nature of the gas and notably its molar mass, the pressure in the filling pipe 4 after the purge step. The corrective quantity may be the result of the difference between the calculated quantity of gas present in the downstream part of the filling pipe 4 before the purge step and the calculated quantity of gas present in the in the downstream part of the filling pipe 4 after the purge step.

Figure 2:
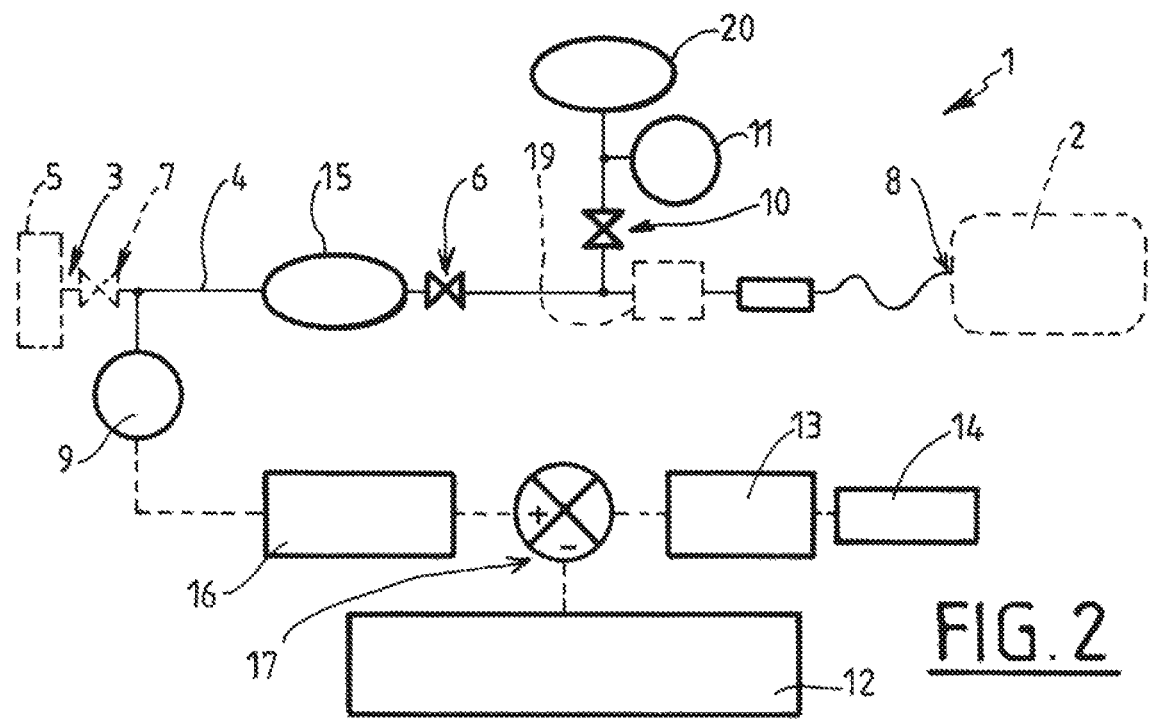
FIG. 2 is a schematic and partial view illustrating one example of a structure and operation of a filling station according to a second possible exemplary embodiment of the invention.

As illustrated in FIG. 2, the station may comprise a second, purge, flow meter 11 situated downstream of the purge valve 10 and configured to measure the quantity of gas purged during the purge step. The determined corrective quantity of gas is, for example, the quantity of gas measured by the purge flow meter 11, or a determined fraction of this quantity.

The generation of a signal indicating the corrected quantity of gas transferred may be obtained by subtracting or by adding a determined quantity of gas from or to the quantity of gas transferred as measured by the flow meter 9 during the transfer step.

This correction may be performed at the end of the transfer step and/or dynamically during the transfer of gas (for example progressively).

For preference, the flow meter 9 is of the type that generates electrical signals in the form of successive pulses each one corresponding to a measured elementary quantity of gas. What that means to say is that each time the flow meter measures the passage of a quantity (for example one gramme) of gas, it emits a pulse. The flow rate corresponds to the number of pulses per unit time (for example a certain number of grams per minute).

The signal indicating the corrected quantity of gas transferred may be obtained by subtracting or by adding a determined quantity of pulses from or to the sum of pulses generated by the flow meter 9 during the transfer step.

As indicated schematically in the figures, the electronic data processing and storage device 12 may comprise or be associated with a pulse counting member 16 and a member 17 for correcting the counted pulses (this or these member(s) 16, 17 may comprise electronic circuit boards or any other suitable device).

Of course, the filling circuit 4 may comprise other elements and notably other valve(s) 7 upstream or downstream of the downstream isolation valve 6 and/or a buffer volume between the flow meter 9 and the downstream isolation valve 6, an exchanger 19 for cooling the gas downstream of the downstream isolation valve 6, etc.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for measuring the quantity of gas introduced into a gas tank via a filling station provided with a filling pipe comprising an upstream end connected to at least one source of pressurized gas and a downstream end connected to a tank that is to be filled, the filling pipe comprising a flow meter and at least one downstream isolation valve positioned between the flow meter and the downstream end of the filling pipe, the method comprising the steps of:
    transferring gas from the source to a tank while the downstream isolation valve is open;
    interrupting the transfer of gas with closure of the downstream valve;
    measuring, using the flow meter, the quantity of gas transferred during said transferring step; and
    generating a signal indicating a corrected quantity of gas transferred, said generated signal being obtained by reducing or by increasing, by a determined corrective quantity, the transferred quantity of gas measured by the flow meter during the transfer step, wherein:
        i) the final pressure in the tank or in the filling pipe at the end of the transfer step is measured or estimated, the determined corrective quantity is a quantity which varies according to the final pressure, the determined corrective quantity is a predetermined quantity that is fixed according to a pressure interval at the end of the transfer step, the determined corrective quantity is between 11 and 5 grams when the pressure in the tank that is to be filled or in the filling pipe is between 850 and 700 bar, the determined corrective quantity is between 8 and 2.5 grams when the pressure in the tank that is to be filled or in the filling pipe is between 700 and 400 bar, the determined corrective quantity is between 6 and 1 grams when the pressure in the tank that is to be filled or in the filling pipe is between 400 and 200 bar.

2. The method of claim 1, wherein the generated signal is stored and/or transmitted and/or displayed.

3. The method of claim 1, wherein generated signal is used in a step of calculating the charge to be made for the quantity of gas introduced into the tank.

4. The method of claim 1, wherein the determined corrective quantity of gas is a quantity which varies according to the temperature of the gas in the tank that is to be filled or in the filling pipe.

5. The method of claim 1, wherein:
    the determined corrective quantity of gas is calculated by a perfect-gas or real-gas equation applied to the gas in the downstream part of the filling pipe before the purge step and after the purge step on the basis of the following parameters: a known volume of the filling pipe downstream of the downstream isolation valve, the measured final pressure in the tank that is to be filled or in the filling pipe at the end of the transfer step before the purge step, a measured or estimated temperature of the gas in the tank that is to be filled or in the filling pipe, a known molar mass of gas, the pressure in the filling pipe after the purge step; and
    the corrective quantity is the result of the difference between the calculated quantity of gas present in the downstream part of the filling pipe before the purge step and the calculated quantity of gas present in the downstream part of the filling pipe after the purge step.

6. The method of claim 5, wherein the filling pipe comprises a purge flow meter situated downstream of the purge valve for measuring the quantity of gas purged during the purge step, and the determined corrective quantity of gas is the quantity of gas measured by the purge flow meter or a determined fraction thereof.

7. The method of claim 1, wherein the generated signal is obtained by subtracting or by adding a determined quantity of gas from or to the quantity of gas transferred as measured by the flow meter during the transfer step.

8. The method of claim 7, wherein:
    the flow meter is adapted and configured to generate electric signals in the form of successive pulses each corresponding to an elementary measured quantity of gas; and
    the generated signal is obtained by subtracting or by adding a determined quantity of pulses from or to the sum of the pulses generated by the flow meter during the transfer step.

9. The method of claim 1, wherein the filling station further comprises an electronic data processing and storage device that comprises a microprocessor or a computer, said electronic data processing and storage device being configured to receive a signal indicative of the quantity of gas transferred as measured by the flow meter during the transfer step and to calculate and/or receive and/or transmit and/or display the signal indicating the corrected quantity of gas transferred.

10. A filling station for filling tanks with pressurized fluid, the pressurized fluid being pressurized hydrogen, comprising a filling pipe and an electronic data processing and storage device, wherein:

- the filling pipe comprises an upstream end connected to at least one source of pressurized gas, at least one downstream end intended to be connected to a tank that is to be filled, a flow meter, and at least one downstream isolation valve positioned between the flow meter and the downstream end of the filling pipe;
- the at least one valve being operable in such a way so as to allow the pressurized fluid to be transferred from the source to the tank;
- the flow meter is configured to measure a quantity of gaseous hydrogen transferred and to generate a first signal that corresponds to the measured quantity of gaseous hydrogen transferred;
- the electronic data processing and storage device comprises a microprocessor or a computer;
- the electronic processing and storage device is configured to receive the first signal from the flow meter and to generate a second signal indicating a corrected quantity of gaseous hydrogen transferred;
- the corrected quantity of gaseous hydrogen transferred is obtained by reducing or by increasing, by a determined corrective quantity, the transferred quantity of gaseous hydrogen measured by the flow meter during the transfer, wherein:
  i) the final pressure in the tank or in the filling pipe at the end of the transfer step is measured or estimated, the determined corrective quantity is a quantity which varies according to the final pressure, the determined corrective quantity is a predetermined quantity that is fixed according to a pressure interval at the end of the transfer step, the determined corrective quantity is between 11 and 5 grams when the pressure in the tank that is to be filled or in the filling pipe is between 850 and 700 bar, the determined corrective quantity is between 8 and 2.5 grams when the pressure in the tank that is to be filled or in the filling pipe is between 700 and 400 bar, the determined corrective quantity is between 6 and 1 grams when the pressure in the tank that is to be filled or in the filling pipe is between 400 and 200 bar.

* * * * *